(12) United States Patent
Lopez

(10) Patent No.: US 11,769,027 B1
(45) Date of Patent: Sep. 26, 2023

(54) STORM DRAIN SYSTEM WITH SCANNABLE CODING FOR UPLOADING DATA

(71) Applicant: Emilio Lopez, Coral Gables, AL (US)

(72) Inventor: Emilio Lopez, Coral Gables, AL (US)

( * ) Notice: Subject to any disclaimer, the term of this patent is extended or adjusted under 35 U.S.C. 154(b) by 0 days.

(21) Appl. No.: 17/724,741

(22) Filed: Apr. 20, 2022

Related U.S. Application Data

(60) Provisional application No. 63/177,785, filed on Apr. 21, 2021.

(51) Int. Cl.
*G06K 19/06* (2006.01)
*E03F 5/04* (2006.01)
*G06F 16/955* (2019.01)

(52) U.S. Cl.
CPC ........ *G06K 19/06037* (2013.01); *E03F 5/041* (2013.01); *G06F 16/9554* (2019.01)

(58) Field of Classification Search
CPC .......................... G06K 19/06037; E03F 5/041
USPC .................................................. 235/375, 376
See application file for complete search history.

(56) References Cited

U.S. PATENT DOCUMENTS

| | | |
|---|---|---|
| 8,017,006 B2 | 9/2011 | Lopez |
| 8,413,882 B1* | 4/2013 | Nidamarthi ............ G06Q 30/00 235/383 |
| 8,444,048 B1* | 5/2013 | Nidamarthi .......... G06Q 30/016 235/375 |
| 2019/0098504 A1* | 3/2019 | Van Betsbrugge ........................ G06Q 10/0833 |
| 2021/0350425 A1* | 11/2021 | Alfia ................... G06F 16/9554 |

* cited by examiner

*Primary Examiner* — Paultep Savusdiphol
(74) *Attorney, Agent, or Firm* — SANCHELIMA & ASSOCIATES, P.A.; Christian Sanchelima; Jesus Sanchelima

(57) ABSTRACT

A system for monitoring the conditions of a plurality of storm drains, comprising the steps of installing scannable codes at or near storm drains, using computerized devices with scanning capabilities to scan said codes, processing the scanned code through a computer application in computerized devices and processing user's added information describing the conditions of said storm drains, uploading the scanned code along with the user's added information to a server through a computer network computer application in said computerized device and processing the scanned code to match the information stored in said server and storing information and making it available to user via different output media. Processing the information to anticipate the needs of the storm drains.

5 Claims, 4 Drawing Sheets

Thank you for scanning the storm drain marker. Your city is using stormwater filters to prevent pollution from entering the drainage system. Upload a photo or video of the storm drain to help document pollution prevention efforts.

402

Click here to upload photos or videos

What objects do you see in front of the storm drain or in the filter basket?
- Leaves and twigs
- Metal cans and objects
- Soft plastics (bags/wrappers)
- Hard plastics (bottles/straws)
- Glass bottles and objects
- Cigarette butts
- Paper objects
- Styrofoam

403

Additional data (e.g. weight of debris)

Comment for your public works department.

Name

Email

CLICK HERE TO SEND

404 of the Invention

STORM DRAIN SYSTEM WITH SCANNABLE CODING FOR UPLOADING DATA

BACKGROUND OF THE INVENTION

1. Field of the Invention

The present invention relates to storm drain systems with scannable coding and, more particularly, to such a storm drain system that includes a worldwide computer network accessible to servers and computerized users for exchanging data relating to the physical conditions of predetermined storm drains and surroundings.

2. Other Related Applications

The present application claims priority date of Apr. 21, 2021 of provisional application Ser. No. 63/177,785.

3. Description of the Related Art

This invention relates to a system and physical devices for communicating data about stormwater debris, pollution and storm drain inlets. More specifically, a combination of storm drain markers that have a scannable code, such as a QR Code (quick response code), and a website or mobile phone app for individuals and organizations to upload photos, documents and/or other information relating to the storm drain inlet and items near the storm drain inlet where the storm drain marker is located.

Roads and highways have grates and curb inlet openings to allow stormwater runoff from the road to enter the storm drain or sewer and into a water retention area, a body of water, or a processing facility. Trash, leaves, debris, oil and other pollutants that flow into the storm drain system through the curb inlet, grates or other means can lead to the pollution of waterways and contribute to flooding when they clog storm drain systems. Therefore, it is important to capture data relating to leaves, trash, debris and pollutants that are at or near the storm drain inlets or stormwater filtration and screening systems. Examples of screening systems include curb inlet filters and baskets that are placed underneath storm drain gratings.

In order to bring awareness to issues relating to stormwater runoff and pollution, several cities, counties and other entities affix a plate commonly referred to as a "storm drain marker" at or near storm drain openings. Storm drain markers are usually a round, rectangular or other shapes and include a message such as, "DO NOT POLLUTE. DRAINS TO WATERWAYS" or other messages to inform the public about the importance of preventing litter, debris and pollutants from entering storm drains.

Some storm drain markers also include a website link or other means for individuals to learn more about pollution. However, storm drain markers do not currently include a scannable QR Code in combination with a website or application that allows users to easily upload images, videos, or other information about the storm drain inlet at or near the storm drain marker.

There exists a need to more effectively capture data about debris, litter and pollution at storm drains, and communicate the data. This invention meets this need by combining a storm drain marker (that has a scannable code) with a website or application for individuals to upload information about the storm drain inlet and/or surrounding infrastructure.

This invention provides an easier way for individuals and organizations to share information about debris, litter and pollution at/near storm drain inlets. The additional data will help to communicate maintenance needs for drainage inlets and streets, and the status of storm drain filters/screens, under-grate baskets, or other technologies used to capture debris and pollutants that enter storm drains. This invention improves upon existing storm drain markers by providing a system for communicating data more effectively. Also, the images, videos and other data uploaded by individuals using this invention will help with community engagement efforts to build awareness about stormwater pollution.

Applicant believes that a related reference corresponds to U.S. Pat. No. 8,017,006 issued for storm water filtration apparatus. Other stormwater catch basins and inlets use stormwater filters/screens to prevent pollution from being discharged into waterways. None of these references, however, teach of a system for interacting and monitoring storm drains that can readily enlist the help of anyone, including passerby individuals. The capabilities of this invention can help to easily provide images, videos, and other data to show stormwater management personnel when the filters or catch basins need additional maintenance. Also, others can use the data to better understand the impacts of using stormwater filters.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for monitoring coded storm drains to allow users and interested passerby individuals for readily reporting the condition of storm drains.

It is another object of this invention to provide such a system that is capable of storing information about the coded storm drains.

It is yet another object of this invention to provide such a system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2A shows another sample illustration of a storm drain marker placed near the storm drain inlets.

FIG. 4 illustrates a sample website layout or application interface that users can use to upload images and other data after scanning the storm drain marker.

DETAILED DESCRIPTION OF THE EMBODIMENTS OF THE INVENTION

Figure 1:
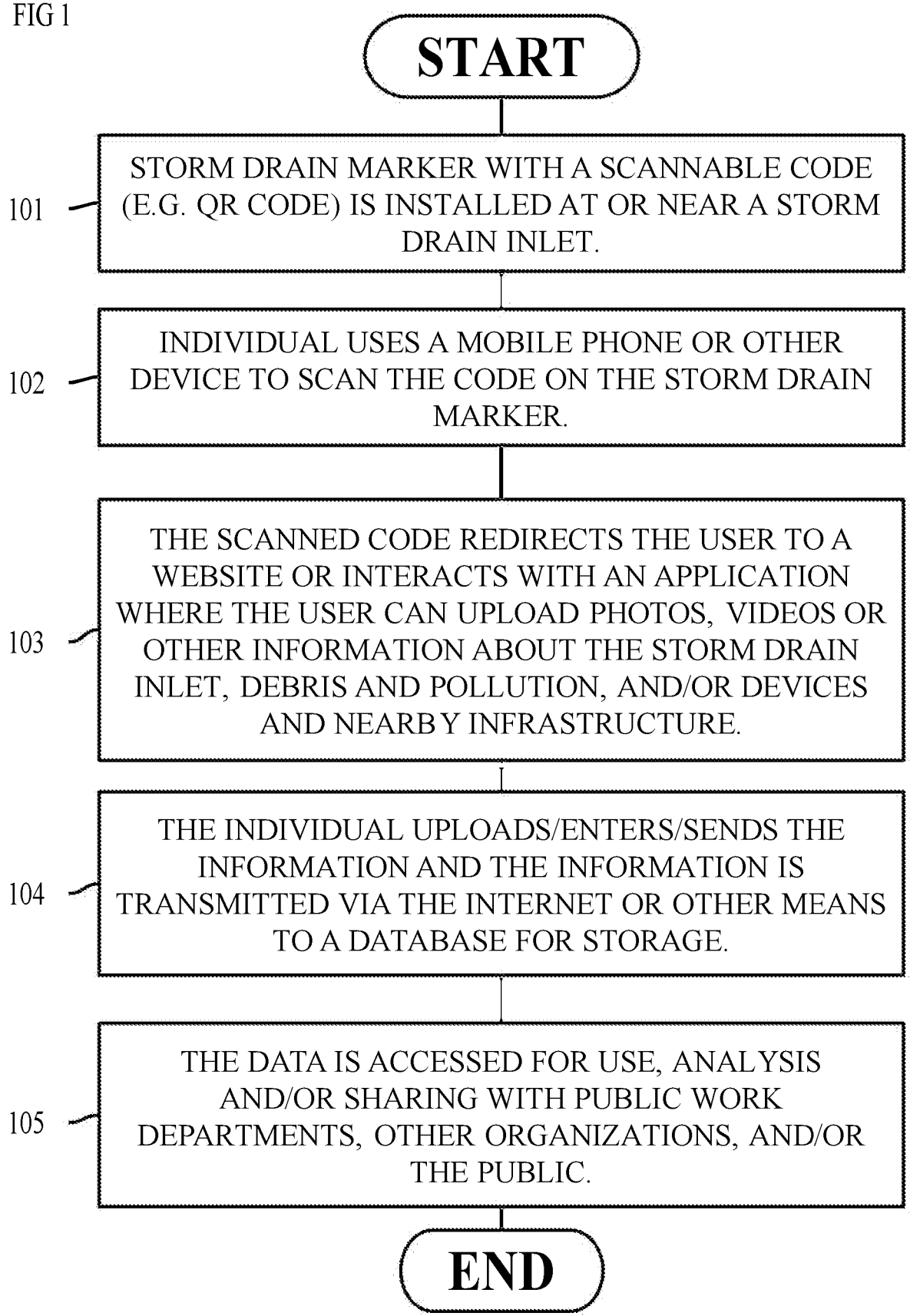
FIG. 1 represents a flowchart with the process steps for the implementation of one of the embodiments for the present invention.

Referring now to FIG. 1, where the present invention is shown as a flowchart, it can be observed that it basically includes the step of installing scannable codes at or near the storm drain inlet as described in box 101, followed by using computerized devices with scanning capabilities as described in box 102, processing the scanned code to interact with a computer application in the computerized devices (such as mobile phones known as smart phones and hereinafter referred to as mobile phones) and/or with a server that includes a website for receiving the scanned code as described in box 103, uploading for storage the information directly to a server's website or through the computer application as described in box 104 and selectively processing the stored information and making it available to user via different output media, as described in box 105.

It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
FIG. 2 shows sample illustration of a storm drain marker placed near the storm drain inlets.
Figure 2:

The process step described in box 101 requires the design of storm drain markers that, in one of the preferred embodiment, includes a scannable code, such as a QR code, bar code, or the like. FIGS. 2 and 2A illustrate examples of drain markers 201 and 203, with scannable codes 202 and 204, respectively. Users scan the unique codes associated with the storm drain marker as described in box 102 of FIG. 1.

When users scan codes 202 or 204, they are directed to a server's website directly, or through a computer application, permitting the users to upload information (photos, text, etc.) about the storm drains and surroundings. Users can utilize smart mobile phones, tablets, or other computerize devices with scanning capabilities that are capable of accessing the worldwide computer network to data servers with websites and databases are connected. Users upload the information associated with the unique codes associated with the storm drain marker including any additional information they may want to add, as described in box 103 of FIG. 1.

Figure 3:
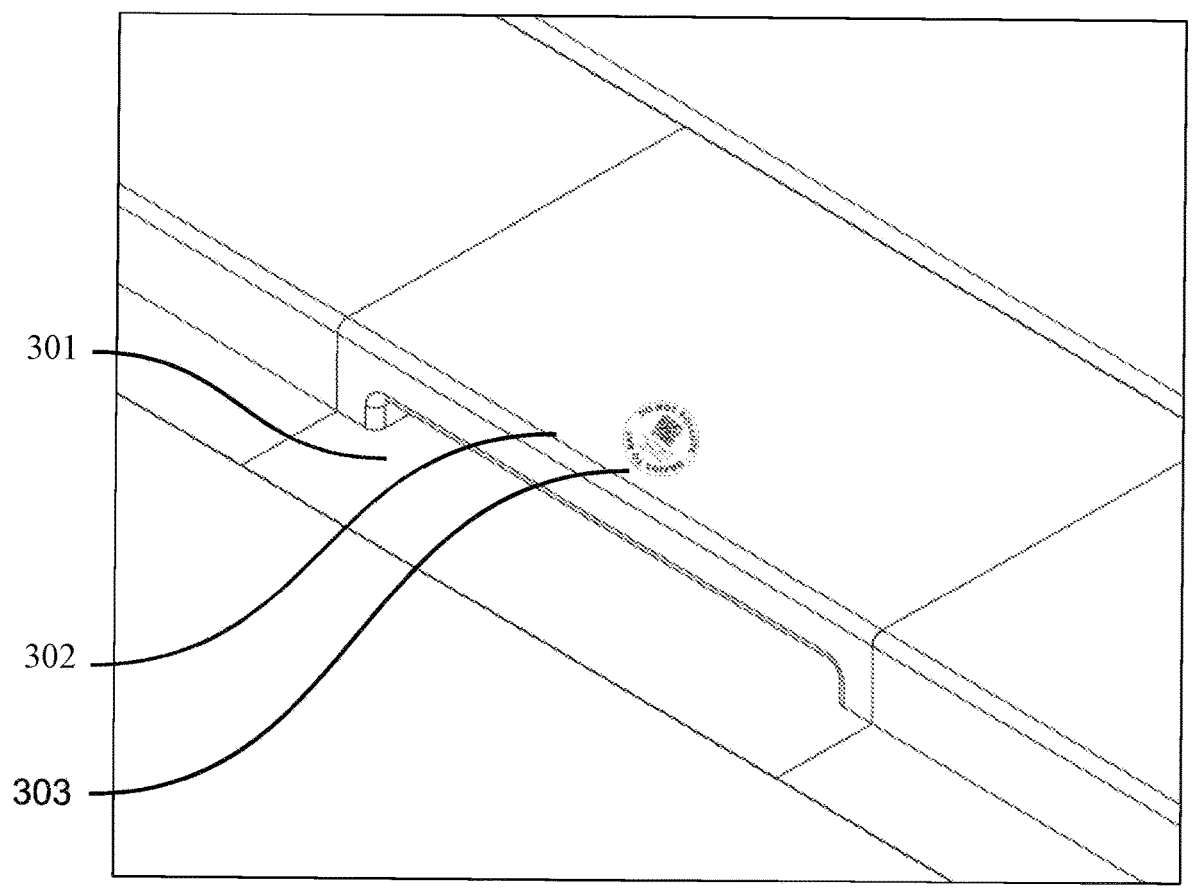
FIG. 3 is an illustration of a typical storm drain inlet where storm drain markers are placed near the storm drain inlets.

Storm drain markers 303 are mounted adjacent to the storm drain inlet or nearby next to the road 301 or sidewalk 302B, as shown in FIG. 3.

FIG. 4 shows an example of a screen of a mobile phone 401 that would also be similar to what a user would find in a server's website. A button 402 provides a pre-programmed option to upload photos or videos. A pre-programmed menu of typical objects or conditions found by the storm drains is provide in one of the screen fields 403. And a pre-programmed button 404 to send or upload the data is also provided to facilitate the operation.

A system consisting of storm drain markers with scannable codes, such as QR codes, bar codes and the like, that connect/link users to a website or application to upload information about the storm drain inlets at or near the storm drain markers. The invention provides an easier method for providing data relating to the storm drain inlet and debris or pollution at inlets or within stormwater filtration baskets or other devices that collect pollutants.

The website or application that users visit after scanning the storm drain marker provides users the ability to easily upload images, videos and other information relating to the storm drain inlets, stormwater filters, or other infrastructure at or near the storm drain markers they scanned. For example, an individual may scan a storm drain marker QR code that includes the URL (uniform resource locator) for a website; then, on the website, the individual can upload a photo of the storm drain and share comments about the litter and debris they observe at or near the storm drain. The data and images are uploaded via the website to a database.

Data is analyzed online and/or offline, and made accessible to stormwater management personnel or other users. The data can provide stormwater maintenance crews and other interested groups with information to better inform when the catch basin or stormwater system needs to be cleaned. Also, data can be used to better understand the state of pollution as it relates to the stormwater system, and can be shared with other stakeholders.

The data collected on the website or application can be images, videos, qualitative data, quantitative data or other information the system allows for. Use and analysis of the data that are uploaded/entered can depend on the needs of public works departments or other organizations interested in the data. For example, computers can use the data and machine learning to recommend which storm drains and catch basins should be cleaned, and send alerts for problem areas that have large amounts of pollution.

In addition to using the scannable storm drain markers at existing stormwater inlets, this technology can be used to augment the capabilities of other technologies aimed at preventing stormwater pollution.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for monitoring storm drains, comprising the steps of:
   A) installing scannable codes at or near the inlet of a storm drain as described in box 101,
   B) using at least one computerized device with scanning capabilities to scan said codes as described in box 102,
   C) processing the scanned code through a computer application in at least one computerized device and further processing a user's added information describing the conditions of said storm drains as described in box 103,
   D) uploading said scanned code along with the user's added information to a server through a computer network and a computer application in said at least one computerized device as described in box 104, and said server further including code information stored and
   E) processing the scanned code to match the code information stored in said server and storing said user's added information and making it available to user via different output media as described in box 105.

2. The system set forth in claim 1 wherein said computer application is an internet browser.

3. The system set forth in claim 1 wherein said at least one computerized device is a mobile phone.

4. The system set forth in claim 1 wherein said scannable codes are QR.

5. The system set forth in claim 1 further including the step of:

F) processing the data collected by said server to anticipate the needs for the storm drains.

\* \* \* \* \*